United States Patent
Saito et al.

(10) Patent No.: US 10,148,373 B2
(45) Date of Patent: Dec. 4, 2018

(54) METHOD FOR CONTROLLING AUDIO SIGNAL PROCESSING DEVICE, AUDIO SIGNAL PROCESSING DEVICE, AND STORAGE MEDIUM

(71) Applicant: Yamaha Corporation, Hamamatsu-shi (JP)

(72) Inventors: Kosuke Saito, Hamamatsu (JP); Masaaki Okabayashi, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/477,548

(22) Filed: Apr. 3, 2017

(65) Prior Publication Data
US 2017/0288798 A1 Oct. 5, 2017

(30) Foreign Application Priority Data
Apr. 4, 2016 (JP) .................................. 2016-075507

(51) Int. Cl.
*H04B 1/00* (2006.01)
*H04H 60/04* (2008.01)
(Continued)

(52) U.S. Cl.
CPC ............ *H04H 60/04* (2013.01); *G06F 3/165* (2013.01); *G11B 27/022* (2013.01); *G11B 27/038* (2013.01); *H04R 5/04* (2013.01); *H04S 3/008* (2013.01); *H04S 5/02* (2013.01); *H04R 2420/01* (2013.01); *H04S 2420/01* (2013.01)

(58) Field of Classification Search
CPC ........................................................ H04B 1/00
See application file for complete search history.

(56) References Cited

U.S. PATENT DOCUMENTS

| | | | | |
|---|---|---|---|---|
| 2004/0131209 A1* | 7/2004 | Okabayashi | ........... | H04H 60/04 381/119 |
| 2011/0026738 A1* | 2/2011 | Aoki | ..................... | H04H 60/04 381/119 |

(Continued)

OTHER PUBLICATIONS

"Digital Mixing Console CL5 CL3 CL1" Reference Manual & Data List, Yamaha Corporation, Apr. 2015. English translation provided.

*Primary Examiner* — Olisa Anwah
(74) *Attorney, Agent, or Firm* — Rossi, Kimms & McDowell LLP

(57) ABSTRACT

In an audio signal processing device including a plurality of mixing buses to mix audio signals processed in a plurality of channels, a switching instruction to switch function of the mixing buses is accepted. In accordance with the switching instruction, operation mode of one or a plurality of switch mixing buses among the plurality of mixing buses is switched between a first mode and a second mode. In first mode, the audio signal processing device controls ON/OFF of signal transmission from each of the channels to the switch mixing bus in accordance with settings of ON/OFF of signal transmission from the each channel to the switch mixing bus, and in second mode, the audio signal processing device controls ON/OFF of signal transmission from each of the channels to the switch mixing bus in accordance with manipulation of cue controls respectively provided to correspond to any of the channels.

7 Claims, 11 Drawing Sheets

(51) Int. Cl.
*G06F 3/16* (2006.01)
*G11B 27/022* (2006.01)
*H04R 5/04* (2006.01)
*H04S 3/00* (2006.01)
*H04S 5/02* (2006.01)
*G11B 27/038* (2006.01)

(56) References Cited

U.S. PATENT DOCUMENTS

2011/0228956 A1* 9/2011 Aiso ............... H04H 60/04
 381/119
2012/0275626 A1* 11/2012 Miura ............. H04H 60/04
 381/119

* cited by examiner

METHOD FOR CONTROLLING AUDIO SIGNAL PROCESSING DEVICE, AUDIO SIGNAL PROCESSING DEVICE, AND STORAGE MEDIUM

TECHNICAL FIELD

The invention relates to a method for controlling an audio signal processing device having a cue function, the audio signal processing device, and a non-transitory machine-readable storage medium containing program instructions for enabling a computer to control the audio signal processing device.

BACKGROUND ART

It has been conventionally known that an audio signal processing device for processing audio signals in a plurality of channels (ch), such as a digital mixer and the like, has a function of allowing a user to select any channel to monitor the audio signal of the selected channel (see NPL1). Such a function is called a cue function.

Then, in the case of providing the cue function, a dedicated mixing bus, referred to as a "cue bus", is provided for producing an audio signal for the monitoring. In the cue bus, the audio signal in the channel selected by the user is mixed, and then the resultant audio signal is outputted to a monitor terminal.

CITATION LIST

Non Patent Literature

NPL1 "DIGITAL MIXING CONSOLE CL5/CL3/CL1 Reference Manual", YAMAHA Corporation, April, 2015

SUMMARY OF INVENTION

Technical Problem

In a conventional audio signal processing device, the cue function is performed using a dedicated cue bus, and therefore providing a plurality of cue buses is difficult in terms of costs. Accordingly, an audio signal for use in monitoring is often output in only one line. However, this number is insufficient for requirements in actual use of the audio signal processing device.

For example, when both a monitor speaker, called a wedge, and IEM (In-Ear Monitor), such as earphone(s) and/or the like, are concurrently used in a live music concert or the like, there is a need to monitor sounds from these output devices in an individual manner. In another example, in a concert hall or the like, an engineer in FoH (Front of House) and another engineer in a stage wing want to monitor different sounds.

However, providing a plurality of cue buses to respond such requests involves a disadvantage leading to an increase in cost.

It is an object of the present invention to address such circumstances to enable simultaneous monitoring of audio signals at multiple different points at low cost in an audio signal processing device.

Solution to Problem

In order to achieve the above-described object, a method according to the invention is a method for controlling an audio signal processing device having a plurality of mixing buses, each of the mixing buses mixing audio signals processed in a plurality of channels, including: accepting a switching instruction to switch a function of the mixing buses; and switching operation mode of one or a plurality of switch mixing buses among the plurality of mixing buses between a first mode and a second mode in accordance with the switching instruction, wherein, in the first mode, the audio signal processing device controls ON/OFF of signal transmission from each of the channels to the switch mixing bus in accordance with settings of ON/OFF of signal transmission from the each channel to the switch mixing bus, and wherein in the second mode, the audio signal processing device controls ON/OFF of signal transmission from each of the channels to the switch mixing bus in accordance with manipulation of cue controls respectively provided to correspond to any of the channels.

In such a method, it is conceivable that the audio signal processing device has a cue bus in addition to the plurality of mixing buses, and the audio signal processing device controls ON/OFF of signal transmission from each of the channels to the cue bus in accordance with manipulation of the cue controls respectively provided to correspond to any of the channels.

Further, it is conceivable that the method further includes setting, for each of the channels, whether a transmission destination, in a case of transmitting an audio signal outputted from the channel in accordance with the manipulation of the cue controls, is the cue bus or the switch mixing bus; and controlling the audio signal processing device such that, when the operation mode of the switch mixing bus is the second mode and the audio signal processing device transmits the audio signal outputted from the each channel in accordance with the manipulation of the cue controls, the audio signal processing device selects a transmission destination of the audio signal in accordance with the set transmission destination.

It is also conceivable that the method further includes: controlling the audio signal processing device such that, when the operation mode of the switch mixing bus is the second mode, the audio signal processing device selects whether a transmission destination, in a case of transmitting an audio signal outputted from the each channel in accordance with the manipulation of the cue controls, of the audio signal is the cue bus or the switch mixing bus on the basis of whether the manipulated cue control is provided in the audio signal processing device or provided in a remote control device located outside of the audio signal processing device.

Alternatively, it is also conceivable that the switch mixing bus is a bus for further mixing a first audio signal processed in a first input channel and a second audio signal which has already been mixed in another mixing bus and then is supplied to the switch mixing bus without passing through any of input channels including the first input channel after the mixing.

Further, it is conceivable that in the accepting, the switching instruction to switch the function of the mixing buses is accepted for each of a plurality of groups of mixing buses among the plurality of the mixing buses, each of the plurality of groups including one or a plurality of switch mixing buses, and in the switching, the switching instruction corresponding to any of the groups of the mixing buses, in accordance with the switching instruction corresponding to one group, the operation mode of the switching mixing buses in the one group is switched between the first mode and the second mode.

The above configuration can be realized or embodied as an arbitrary style such as a system, a device, a computer program, a storage medium storing a computer program, other than the above method.

Advantageous Effects of Invention

With the configuration according to the invention, simultaneous monitoring of signals at multiple different points is enabled at low cost in an audio signal processing device.

DESCRIPTION OF EMBODIMENTS

Embodiments in accordance with the invention will now be described in detail with reference to the accompanying drawings.

First, an audio signal processing device in accordance with one embodiment of the invention is described.

Figure 1:
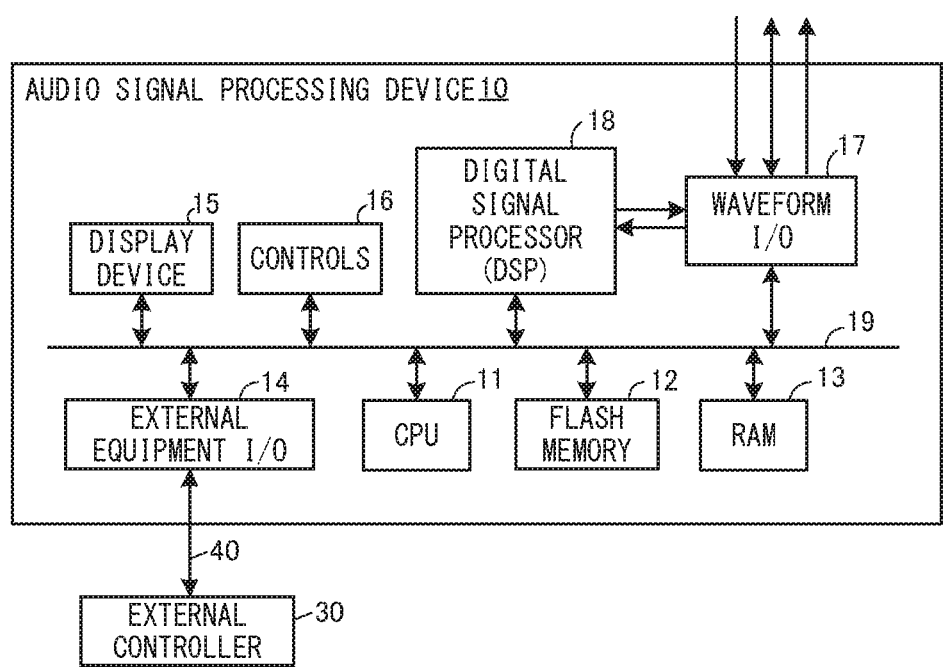
FIG. 1 is a block diagram illustrating a hardware configuration of an audio signal processing device in accordance with an embodiment of the invention.

FIG. 1 is a block diagram illustrating a hardware configuration of the audio signal processing device.

The audio signal processing device 10 illustrated in FIG. 1 includes a CPU 11, a flash memory 12, a RAM 13, an external equipment I/O 14, a display device 15, controls 16, a waveform input/output unit (I/O) 17, and a digital signal processor (DSP) 18, which are connected to each other through a system bus 19. Such an audio signal processing device 10 may be configured as, for example, a digital mixer. However, the audio signal processing device 10 is not limited to this, and may be configured as any device to mix audio signals processed in a plurality of channels.

In the configuration illustrated in FIG. 1, the CPU 11 is a controller circuitry that controls the general operation of the audio signal processing device 10. The CUP 11 executes a required program stored in the flash memory 12 to control required hardware in order to implement various functions of controlling display on the display device 15, detecting that the controls 16 are manipulated, controlling audio signal processing performed in the DSP 18, and the like.

The flash memory 12 is a nonvolatile rewritable storage that stores a control program executed by the CPU 11, and/or the like.

The RAM 13 is a memory that stores data required to be temporarily stored, and that is used as work memory of the CPU 11.

The external equipment I/O 14 is an interface through which various types of external equipment are connected for input and/or output. For example, an interface for communication with an external controller 30 over a network 40 is provided. The external controller 30 is a remote controller for externally operating the audio signal processing device 10. The external controller 30 may be, for example, a mobile PC (Personal Computer), a tablet computer, a smartphone or the like in which a required application program is executed to implement remote control functionality. Alternatively, the external controller 30 may be a dedicated controller. The network 40 may be a wireless network or a wired network. Further, the network 40 may equally be peer-to-peer communication network.

Further, as the external equipment I/O 14, in addition to the above, an interface for connection to an external display, a mouse, a text input keyboard, a control panel, a mobile storage medium, and/or the like may be provided.

The display device 15 is configured with a liquid crystal display (LCD), lamp, and/or the like. The display device 15 is a device that display, for a user, information on setting conditions and an operation state of the audio signal processing device 10.

The controls 16 are devices that accepts manipulation of the audio signal processing device 10, which may include various keys, buttons, rotary encoders, sliders, a touch panel laminated on the LCD of the display device 15, and/or the like.

Where the external controller 30 may be used to control the audio signal processing device 10, the display device 15 and the controls 16 can be omitted, or alternatively significantly simple structure may be adopted therefor.

The waveform I/O 17 is an interface that accepts input of audio signals to be processed in the DSP 18, and that outputs the audio signals after being processed.

The DSP 18 includes a signal processing circuit. The DSP 18 is a signal processor that applies various types of signal processing, such as mixing, equalizing and/or the like, to audio signals inputted from the waveform I/O 17 in accordance with various processing parameters set as current data, and then outputs the resultant audio signals to the waveform I/O 17. The current data including the parameters used in the processing is stored in the memory on the RAM 13 or a memory provided in the DSP 18 itself. The user can use the display device 15 and the controls 16 to check or change values of the parameters.

Figure 2:
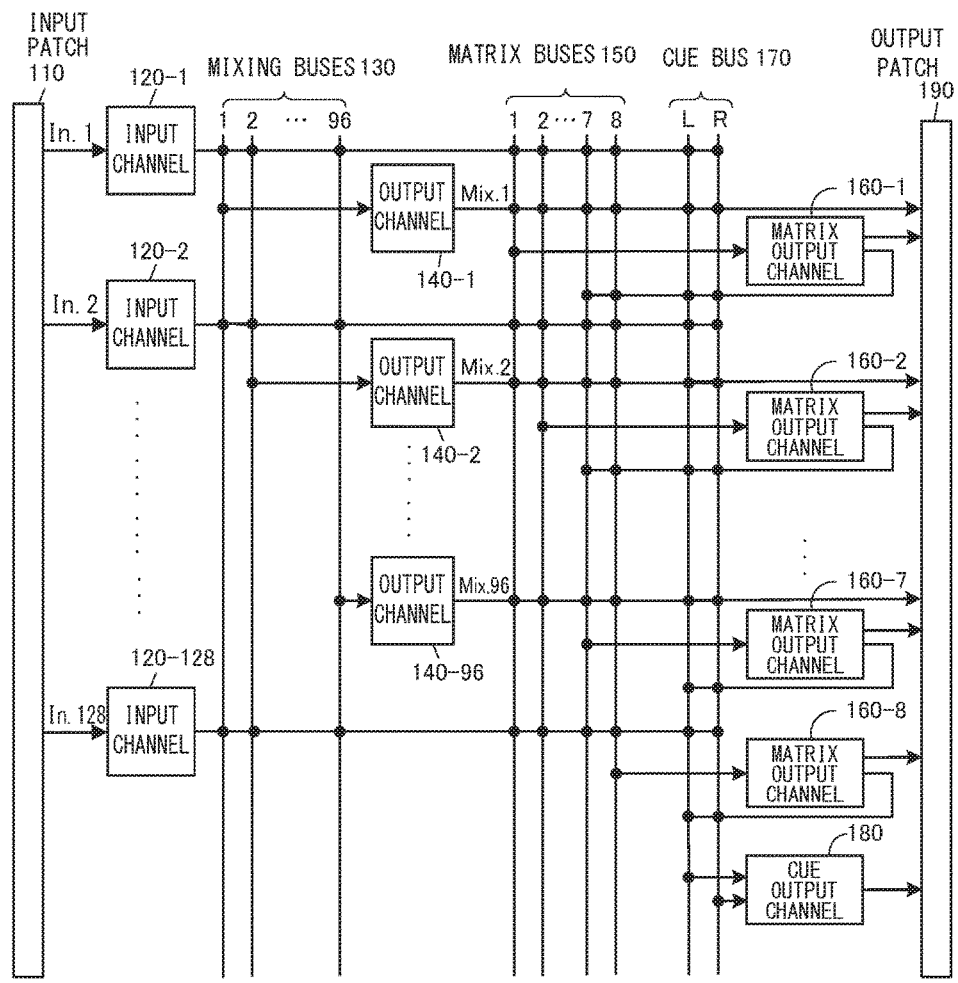
FIG. 2 is a diagram illustrating in detail a configuration of signal processing executed by the DSP shown in FIG. 1.

Next, FIG. 2 illustrates details of the configuration of the signal processing executed in the DSP 18 shown in FIG. 1.

As illustrated in FIG. 2, the signal processing in the DSP 18 includes an input patch 110, input channels 120-1 to 120-128, mixing buses 130, output channels 140-1 to 140-96, matrix buses 150, matrix output channels 160-1 to 160-8, a cue bus 170, a cue output channel 180, and an output patch 190.

In the DSP 18, through the input patch 110, any of input ports of analog input and digital input prepared corresponding to the input terminal of the waveform I/O 17 are patched (connected) respectively to the 128 input channels 120, i.e., from 120-1 to 120-128 (reference sign without suffix after hyphen is used except in cases where individual must be identified, and ditto for other reference signs.)

Figure 3:
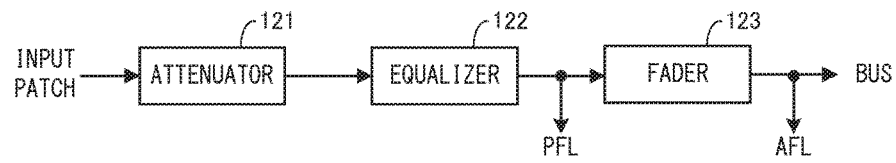
FIG. 3 is a schematic diagram illustrating a configuration of the input channel shown in FIG. 2.

In each input channel 120, as illustrated in FIG. 3, signal processing elements, such as an attenuator 121, an equalizer 122 and a fader 123, are used to apply signal processing to the signal inputted from the patched input port. Then, the resultant signal after the processing is outputted to any of the mixing buses 130 with 96 lines. As a matter of course, any signal processing element(s) other than the above may be provided. Although, in FIG. 2, the output from the input channel 120 to each line of the mixing buses 130 is shown by a single line for reasons of illustration, on/off setting and level adjustment can be made for each combination of the source input channel 120 and the destination line of the mixing buses 130 for the output. Output to the matrix buses 150 and the cue buses 170 will be described later.

Next, in each line of the mixing buses 130, a signal incoming from each input channel 120 is mixed and then outputted to an output channel 140 of the 96 channels 140-1 to 140-96 corresponding to the line. Then, in each output channel 140, an equalizer, a compressor, a fader and/or the like, as in the case of the input channel 120, are used to apply signal processing to the signal incoming from the corresponding line of the mixing buses 130. However, the kinds and the order of the signal processing elements are not required to be the same as that in the input channel 120.

Next, the matrix buses 150 are equipped with 8 lines. Signals of channels arbitrarily selected from the input channels 120-1 to 120-128 and the output channels 140-1 to 140-96 are inputted to each line of the matrix buses 150 and mixed in the line. Accordingly, each of the input channels 120 and each of the output channels 140 also outputs the resultant signal to each line of the matrix buses 150. The signal outputs can be subjected to on/off setting and level adjustment for each combination of the source channel 120 or 140 and the destination line of the matrix buses 150.

Further, the signal after the mixing in each line of the matrix buses 150 is outputted to a matrix output channel 160 of the 8 channels 160-1 to 160-8 corresponding to the line. Then, in each matrix output channel 160, an equalizer, a compressor and/or the like are used to apply similar signal processing to that in the output channel 140 to the signal incoming from the corresponding line of the matrix buses 150.

It is noted that the configuration enables signal outputs from the first to sixth matrix output channels 160-1 to 160-6 to the seventh matrix bus 150-7 and the eighth matrix bus 150-8 of the matrix buses 150. The outputs can be individually subjected to on/off setting and level adjustment. The outputs are provided for use of the seventh matrix bus 150-7 and the eighth matrix bus 150-8 as second cue bus. This will be described later.

Next, the cue bus 170 is a stereo bus having two LR lines, and is a bus for generating a monitor signal used for monitoring. Therefore, each input channel 120, each output channel 140 and each matrix output channel 160 have signal output paths to the cue bus 170, and the signal outputs are configured to be individually subjected to on/off setting and level adjustment. The signals after the mixing in the cue bus 170 are outputted to the cue output channel 180 as a stereo signal. Then, in the cue output channel 180, simple signal processing including level adjustment and/or the like is applied. Since the cue bus 170 is provided for monitoring signals under processing in each channel, it is not necessary to subject the monitor signal generated in the cue bus 170 to extensive signal processing as done in the output channel 140. However, the signal processing as done in the output channel 140 may equally be performed.

Further, the outputs of each output channel 140, each matrix output channel 160 and the cue output channel 180 are supplied to the output patch 190. Through the output patch 190, these various output channels are patched to output ports of the analog output and the digital output prepared corresponding to the output terminal of the waveform I/O 17, so that the signals processed by the output channels are supplied to the patched output ports to be outputted from the output ports.

The cue output channel 180 may be fixedly patched to a predetermined monitor output terminal or may output signals without passing through the output patch 190.

The signal processing performed in each of the above components provided in the DSP 18 is controlled based on a presently set value of each parameter stored in the memory (current data). The parameter value can be adjusted for each signal processing element in the channels and others by use of the controls on a control panel 200. Further, the function of each component in the DSP 18 may be implemented by software or may be implemented by hardware.

Since the audio signal processing device 10 is equipped with the cue bus 170 and the cue output channel 180, a human operator is enabled to monitor signals of arbitrary channels without affecting signals sent from each input channel 120, each output channel 140 and each matrix output channel 160 to the buses or to the output patch 190. A method of selecting a channel to be monitored and signal of which position in a channel is monitored will be described later.

Figure 4:
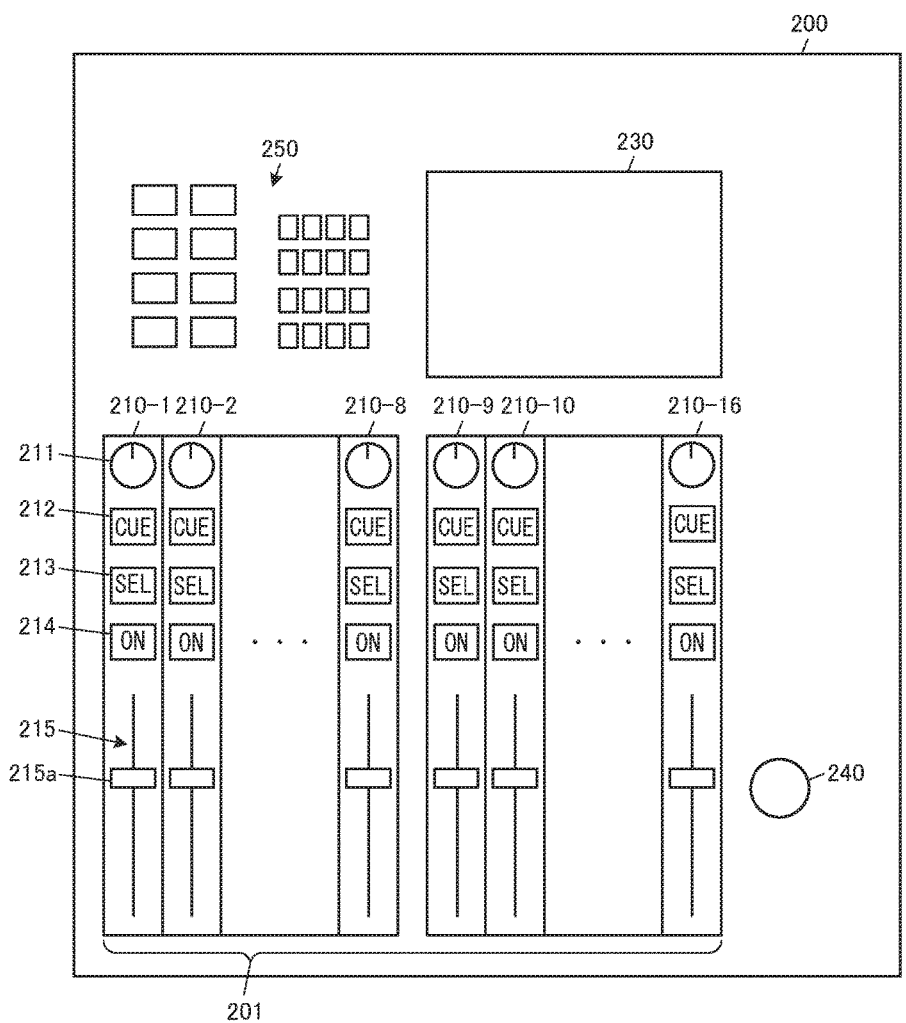
FIG. 4 is a schematic diagram illustrating a configuration of a control panel of the audio signal processing device shown in FIG. 1.

Next, FIG. 4 illustrates a schematic configuration of the control panel of the audio signal processing device 10.

As illustrated in FIG. 4, the control panel 200 of the audio signal processing device 10 includes a channel strip section 201, a display 230, a rotary encoder 240, and a switch group 250.

The channel strip section 201 includes 16 channel strips 210. A signal processing channel such as the input channel 120, the output channel 140, the matrix output channel 160 and/or the like is assigned to each channel strip 210 as a manipulation target by use of a layer and/or the like, so that each control included in the channel strip 210 can be used as a control for manipulation of the assigned channel. Note that a group of channels such as a DCA group and/or the like may be assigned to the channel strip 210.

In turn, each of the channel strips 210 includes a rotary encoder 211, a cue key 212, a selection key 213, an ON key 214, and a fader 215.

The rotary encoder 211 among them is a control to which a parameter included in the assigned channel is assigned and used to adjust the value of the assigned parameter.

The cue key 212 is a cue control for instructions to monitor the channel (output a signal from the assigned channel to the cue bus 170). Various possible ways to select a channel to be monitored in response to manipulation of the cue key 212 include toggling between on and off for each channel, a later-selection-priority, and the like. This will be described later.

The selection key 213 is a control for selecting the assigned channel.

The on key 214 is a control toggled for adjusting a parameter defining on/off of audio signal transmission from the assigned channel.

The fader 215 is a control for adjusting a value of a fader parameter for the assigned channel through manipulation of a knob 215a.

Next, the display 230 is a display portion and an operating portion that display a GUI (Graphical User Interface) screen in order to accept various operations including setting of parameter values, assignment of a parameter to a control, and the like, and display an operation status of the audio signal processing device 10 or presently set parameter values. The display 230 is also able to display a screen indicating settings for the monitor (cue function), and a screen for accepting the settings regarding the monitor.

The rotary encoder 240 is a control to which an arbitrary parameter including the parameters described up to this point can be assigned and used for adjustment of the assigned parameter.

The switch group 250 includes an arrangement of switches providing various functions including a layer selection.

Figure 5:
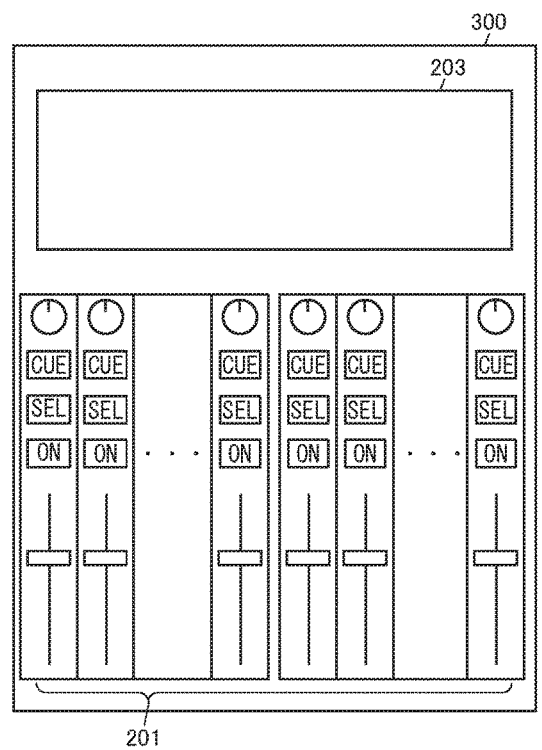
FIG. 5 is a diagram of example of an operating screen displayed on the external controller shown in FIG. 1.

Next, FIG. 5 illustrates an example of operation screens displayed on the external controller 30.

The external controller 30 has a display 300 on which a GUI screen for accepting manipulation of the audio signal processing device 10 is displayed to allow the user to operate the GUI screen for manipulation of the audio signal processing device 10.

FIG. 5 illustrates an example of a screen for accepting manipulation for each channel.

In the screen illustrated in FIG. 5, the display 300 displays the channel strip section 201 as well as a detail displaying area 203 corresponding to the display 230 illustrated in FIG. 4. In the screen, as in the case of the control panel 200, a channel is assigned to each channel strip 210 of the channel strip section 201, so that the channel strip 210 can be used as controls for operation pertinent to the assigned channel. The operation includes instruction to monitor the assigned channel through manipulation of the cue control.

One characteristic feature of the audio signal processing device 10 described above is that a bus other than the cue bus 170 is configured to be temporarily used as an additional cue bus. This is described below in detail. Note that, in the embodiment, the use of the seventh matrix bus 150-7 and the eighth matrix bus 150-8 as additional (second) cue bus is described by way of example, but buses to be used as the additional cue bus is not limited to this.

In the audio signal processing device 10, the seventh matrix bus 150-7 and the eighth matrix bus 150-8 can be operated as matrix buses for implementing the function of a matrix mixer (operation in normal mode which is a first mode). In addition to this, the matrix buses 150-7 and 150-8 are can be switched to the operation as stereo cue bus used for adding a monitor output line in response to an instruction by the user (operation in cue mode which is a second mode).

Figure 6:
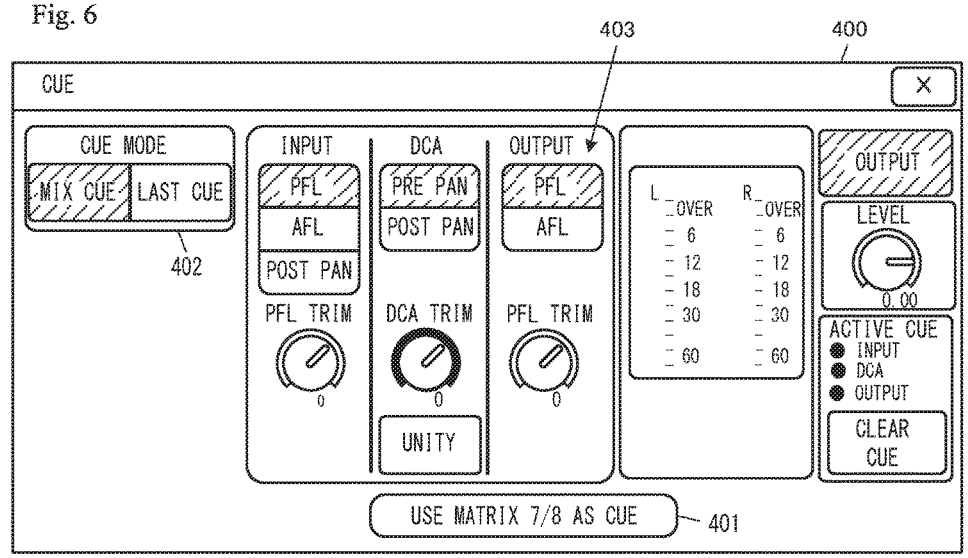
FIG. 6 is a diagram of an example display of a cue setting screen.
Figure 7:
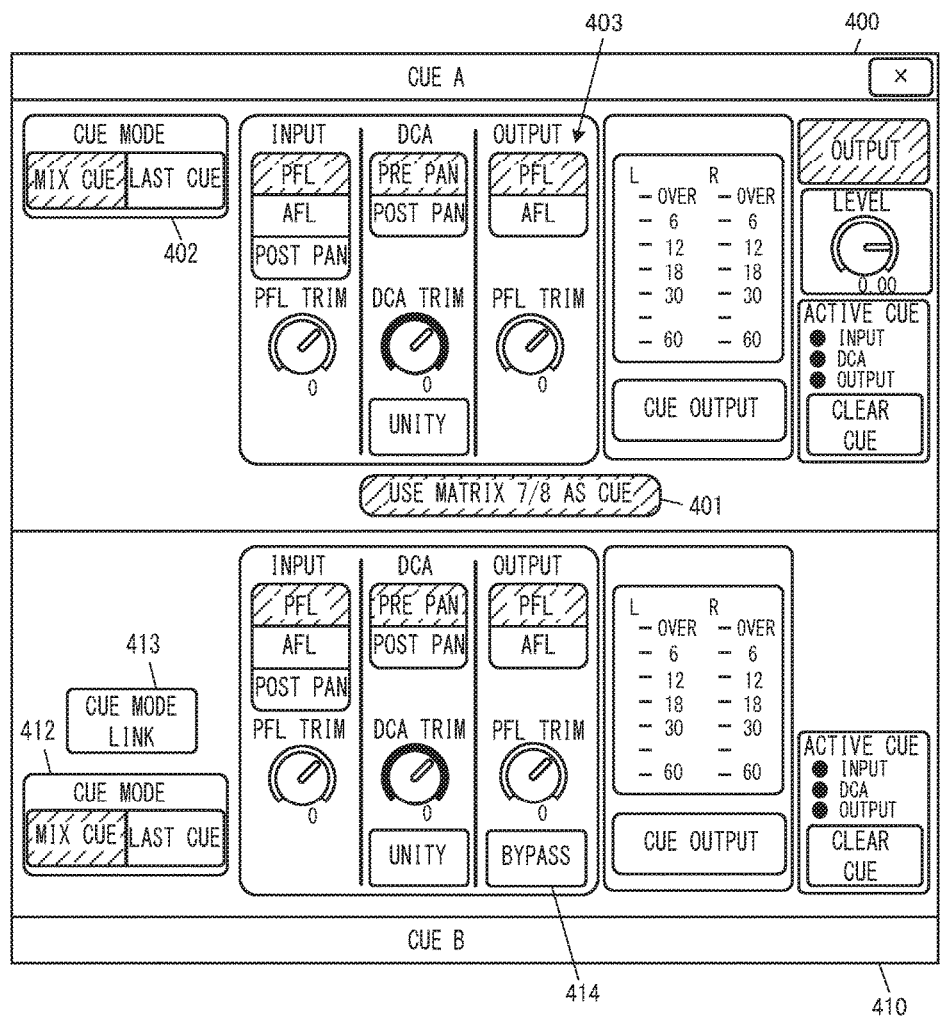
FIG. 7 is a diagram of another example display of the cue setting screen when cue mode is selected.

FIG. 6 and FIG. 7 illustrate screens for accepting the switching operation and settings related to the cue function. FIG. 6 illustrates an example in which the seventh matrix bus 150-7 and the eighth matrix bus 150-8 are in the normal mode (additional cue bus is disabled disabled). FIG. 7 illustrates an example in which the matrix buses 150-7 and 150-8 are in the cue mode (additional cue bus is enabled).

Cue setting screens 400 shown in FIG. 6 and FIG. 7 are displayed on the display 230 of the control panel 200 or the display 300 of the external controller 30. The cue setting screen 400 is a GUI screen for accepting settings related to the cue function.

The cue setting screen 400 includes a cue addition setting button 401. The user can manipulate the button 401 to toggle the seventh matrix bus 150-7 and the eighth matrix bus 150-8 between the normal mode and the cue mode.

Further, a selecting-method setting button 402 is included as a control for selecting a way to select a channel to be monitored from between "MIX CUE" and "LAST CUE". The "MIX CUE" is a mode in which monitoring is toggled on and off for each channel and, if the monitoring is turned on in a plurality of channels, the outputs of the channels are mixed to produce a monitor signal. The "LAST CUE" is a mode in which a channel to be monitored is selected in a later-selection-priority manner, and the output of one channel at a maximum is determined as a monitor signal.

Further, an output selector 403 is included as a control for selecting from which position of the channel to be monitored a signal is extracted for monitoring (for output to the cue bus). In the output selector 403, either "PFL" refereeing to before the fader or "AFL" refereeing to after the fader 123 can be selected, and an output position of the signal corresponding to each choice is shown in FIG. 3, by way of example. Selecting "PFL" enables monitoring a signal prior to the level adjustment in the channel to be monitored. Even when the signal level in this channel is reduced by the fader 123, the signal processed in the channel can be checked. Selecting "AFL" enables a check of a signal actually provided from the channel to be monitored for mixing or output.

Further, when the cue mode is selected through the cue addition setting button 401, as shown in FIG. 7, a cue B setting section 410 is prepared on the cue setting screen 400, so that the settings related to the additional cue bus can be made through the cue B setting section 410. Settable items in the cue B setting section 410 are approximately similar to the settable items in the cue setting screen 400 in the normal mode state. However, when the cue function by the additional cue bus differs from the cue function by the fixed cue bus 170, the settable items also differ in accordance with the different functions.

In the examples shown in FIG. 6 and FIG. 7, an example of the difference of the cue function by the additional cue bus from the cue function by the fixed cue bus 170 is bypass setting made by a bypass setting button 414.

Here, the outputs of the matrix buses 150 are supplied to the output patch 190 through the matrix output channels 160, by which more extensive signal processing than the output of the cue bus 170 passing through the cue output channel 180 can be performed. The above bypass is a function to disable signal processing functions of the matrix output channel 160 which are not provided in the cue output channel 180 in order for a monitor signal subjected to mixing in the matrix bus 150 to be outputted after being applied with signal processing as in the case of the signal being mixed in the cue bus 170. If full use of the functions of the matrix output channel 160 is desired to output a monitor signal subjected to extensive signal processing, the bypass is to be turned off.

The selecting-method setting button 412 is also prepared in the cue B setting section 410, so that a method of selecting a channel to be monitored can be independently selected for the fixed cue bus 170 and the additional cue bus. However, these settings may be linked. A mode link setting button 413 allows switching between on and off of the link.

The settings made on the above screens are stored in the flash memory 12 or RAM 13 by the CPU 11.

Next, setting of cue output destination will be described.

In the audio signal processing device 10, which of the fixed cue bus (A) and the additional cue bus (B) will be used to monitor a signal of the channel when the additional cue bus is enabled can be set for each channel to be monitored such as the input channels 120, the output channels 140, the matrix output channels 160 and the like. This setting becomes active when the relevant channel is selected to be monitored. Note that what can be selected as a monitor target may include a DCA group and/or the like rather than the channels, and therefore the term "channel" is used here to represent all components selectable as a monitor target for the sake of convenience.

Figure 8:
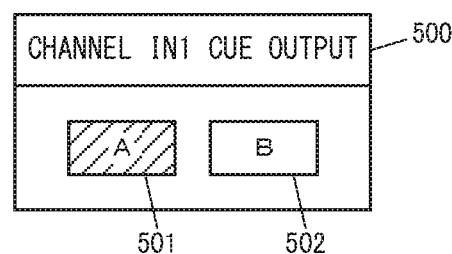
FIG. 8 is a diagram of an example display of a cue output setting screen.

FIG. 8 illustrates an example screen for the setting.

FIG. 8 shows a cue output setting screen 500 for accepting settings of a cue output destination for the first input channel 120-1. The screen includes a cue A selection button 501 for switching between on and off output to the fixed cue bus, and a cue B selection button 502 for switching between on and off output to the additional cue bus. The buttons 501, 502 can be toggled between on and off, but it is not allowed to turn off both the buttons 501, 502 at the same time.

Specifically, there are three settable patterns as cue output destinations, i.e., only the fixed cue bus (A), only the additional cue bus (B), and both of them (A+B).

Figure 9:
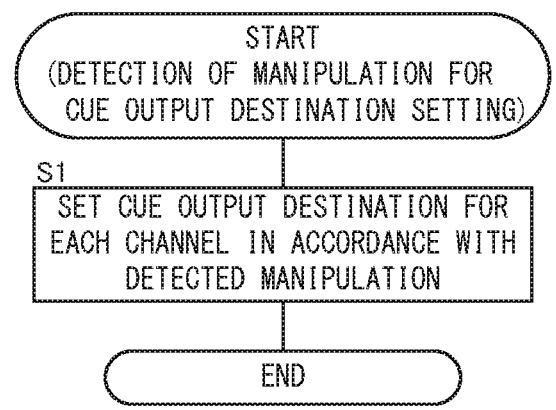
FIG. 9 is a flowchart of processing executed by the CPU of the audio signal processing device shown in FIG. 1 when an output destination setting operation has been performed.

When the setting operation for an output destination is made on the cue output setting screen 500, the CPU 11 executes processing of FIG. 9 to set a cue output destination for each channel (51). The processing of FIG. 9 is processing of a first setting procedure.

Next, processing executed by the CPU 11 for control related to the additional cue bus will be described.

Figure 10:
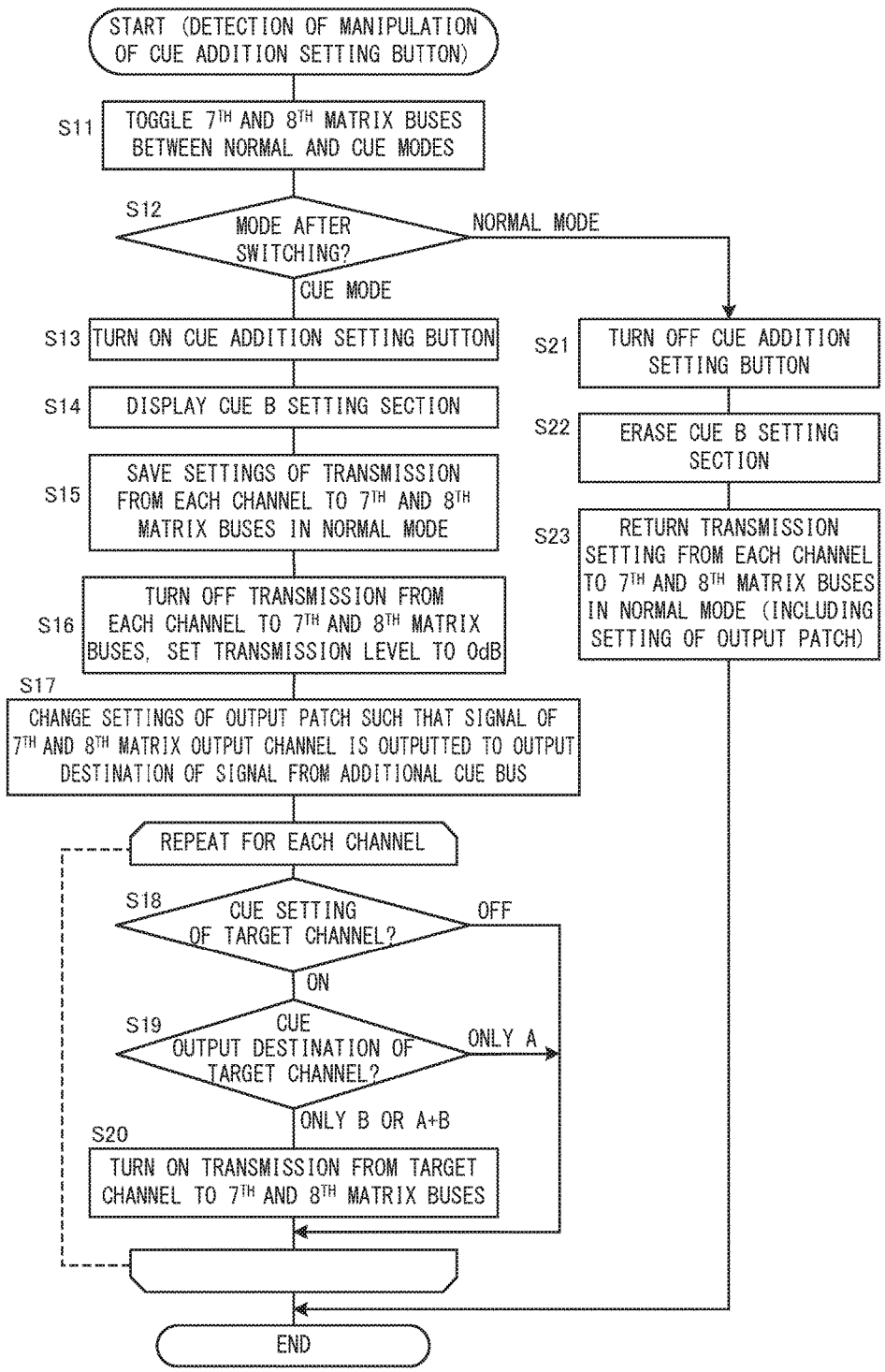
FIG. 10 is a flowchart of processing executed by the CPU when an operation of a cue addition setting button is detected.

Initially, FIG. 10 shows a flowchart of processing when manipulation of the cue addition setting button shown in FIG. 6 and FIG. 7 is detected. The processing to accept manipulation of the cue addition setting button is acceptance procedure processing, and the processing of FIG. 10 is switching procedure processing to enable or disable the additional cue bus.

Upon detection of manipulation of the cue addition setting button 401, the CPU 11 starts the processing shown in FIG. 10.

In the processing, initially, the CPU 11 switches the mode of the seventh and eighth matrix buses 150-7, 150-8 between the normal mode and the cue mode based on a toggle operation (S11). Then, the processing according to the selected mode begins at step S12.

If the selected mode is the cue mode, the CPU 11 turns on the manipulated cue addition setting button 401 (S13), and displays the cue B setting section 410 on the cue setting screen 400 (S14). Then, the CPU 11 saves the settings for transmission from each channel to the seventh and eighth matrix buses 150-7, 150-8 in the normal mode in a predetermined memory region in the memory (S15). The transmission settings are values of parameters in the current memory reflected in the present signal processing when the seventh and eighth matrix buses 150-7, 150-8 are used as the matrix buses, the parameters expressing on/off of the signal transmission from each channel to these buses, the transmission level thereof and/or the like.

Next, the CPU 11 turns off the signal transmission from each channel to the seventh and eighth matrix buses 150-7, 150-8, and sets the transmission level to zero dB (S16). The setting are done in the current memory.

Here, in the normal mode, the presence and absence of the signal transmission to the seventh and eighth matrix buses 150-7, 150-8 and the transmission level thereof are controlled in accordance with the parameter values which are set by the user, and saved in step S15, for the presence and absence of the signal transmission from each channel to the seventh and eighth matrix buses 150-7, 150-8 and the transmission level thereof. Then, the presence and absence of the signal transmission to the seventh and eighth matrix buses 150-7, 150-8 and the transmission level thereof are unaffected by the manipulations of the cue key 212 and the cue button and the cue settings.

However, in the cue mode, the presence and absence of the signal transmission to the seventh and eighth matrix buses 150-7, 150-8 and the transmission level thereof are controlled in accordance with the cue settings. For example, the signal transmission to the seventh and eighth matrix buses 150-7, 150-8 from the channel selected to be monitored is turned on, and the signal transmission to these buses from the other channels is turned off, and the like. The processing in step S16 is for performing settings as initial values in this processing with no signal transmission and no change in signal being effected.

Further, the CPU 11 changes the settings of the output patch 190 such that the signals from the seventh and eighth matrix output channels 160-7, 160-8 will be outputted to the output port set as an output destination of a signal from the additional cue bus (S17). The output destination can be set at the cue B setting section 410.

Following step S17, the CPU 11 repeats the processing in steps S18 to S20 to perform the processing for each channel (which is possibly to be monitored) included in the audio signal processing device 10. Specifically, regarding each channel to be monitored (S18), if the additional cue bus (B) is included in the cue output destinations of the channel (S19), the CPU 11 turns on the signal transmission from the channel to the seventh and eighth matrix buses 150-7, 150-8 (S20). Regarding the other channels, the signal transmission remains off state. The processing in steps S18 to S20 is the processing of the output control procedure.

Note that, in step S20, if settings for sound localization of the monitor stereo signals have been made, the output level from the relevant channel to both the buses may be set based on the set sound localization. The same holds true for the following setting of the signal transmission to the fixed or additional cue bus unless otherwise specified.

By the processing described above, output of monitor signals using the additional cue bus can be started in accordance with the present settings of the cue function in response to the manipulation for enabling the additional cue bus.

On the other hand, in step S12, if the selected mode is the normal mode, the CPU 11 turns off the manipulated cue addition setting button 401 (S21), and erases the cue B setting section 410 from the cue setting screen 400 (S22). Then, the CPU 11 returns the transmission setting from each channel to the seventh and eighth matrix buses 150-7, 150-8 in the normal mode, which is saved in step S15, to the current memory (S23), and the processing is completed. CPU 11 also returns the settings of the output patch 190 in the returning in step S15.

The processing described above results in the return of the operation of the seventh and eighth matrix buses 150-7, 150-8 to the operation as matrix buses in response to the manipulation for disabling the additional cue bus. In this case, the seventh and eighth matrix buses 150-7, 150-8 can operate in accordance with the settings saved at the time when the additional cue bus is enabled.

Figure 11:
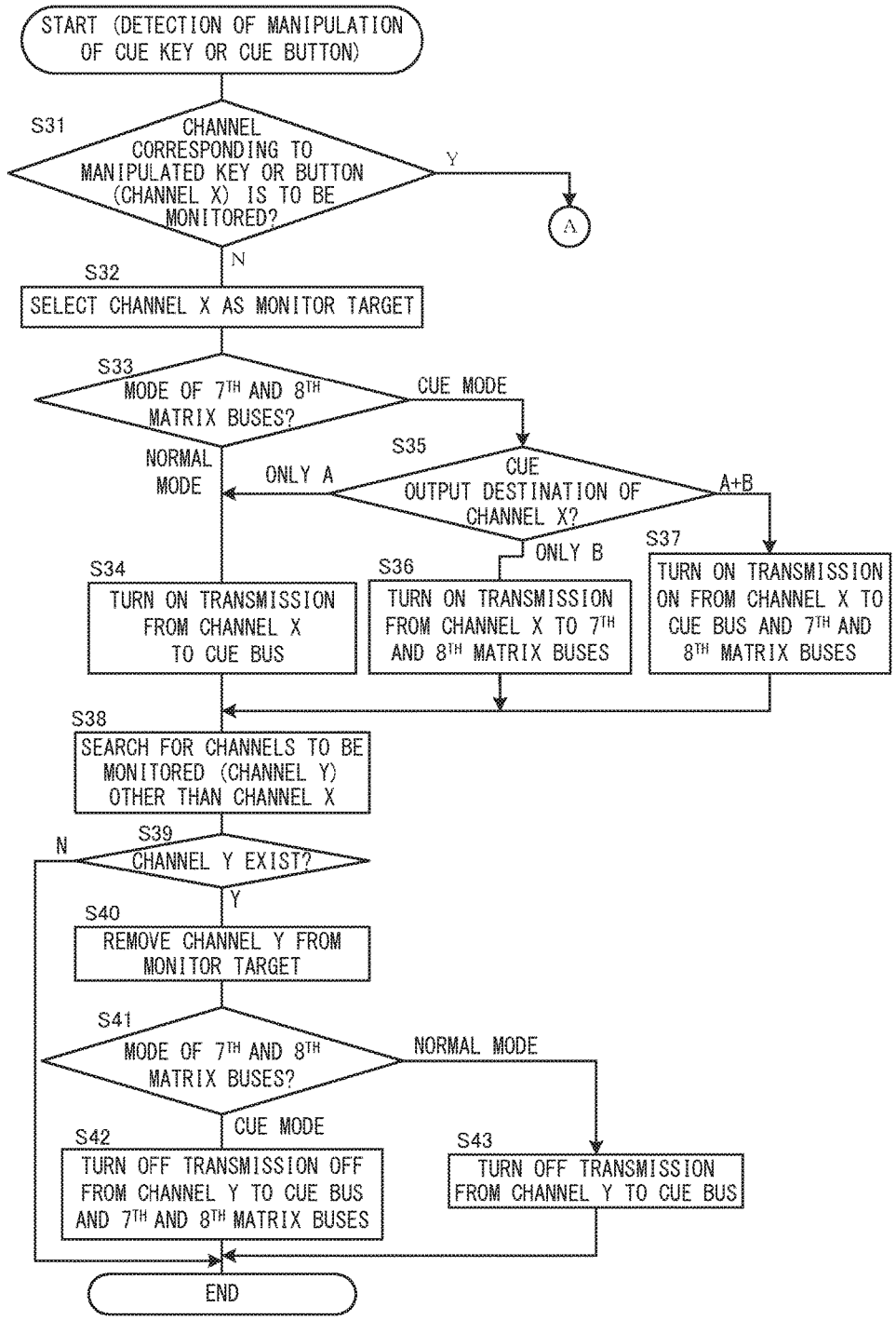
FIG. 11 is a flowchart of processing executed by the CPU when an operation of a cue key or a cue bottom is detected.
Figure 12:
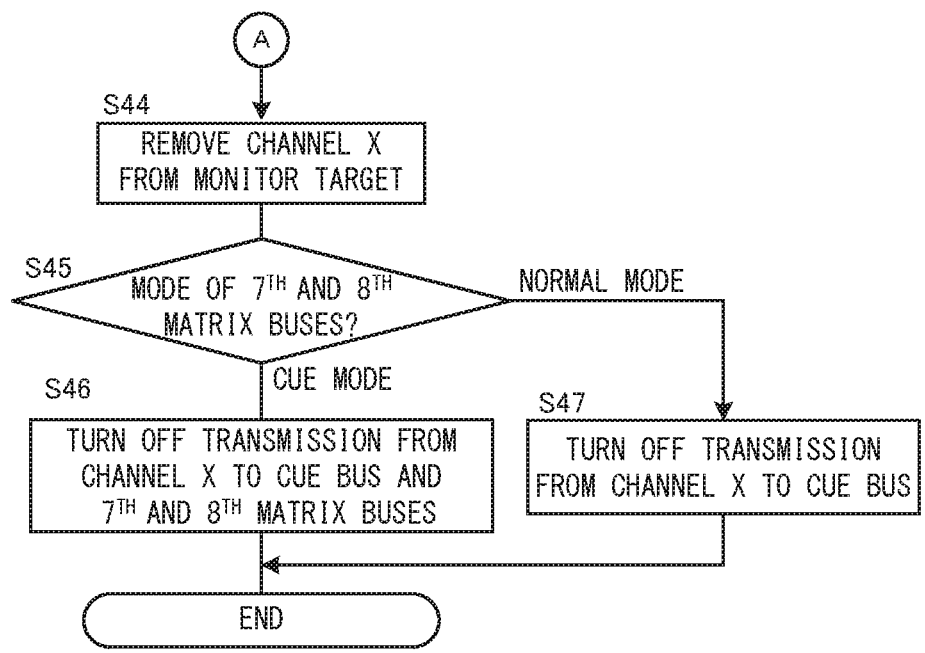
FIG. 12 is a flowchart of the processing continued from FIG. 11.

Next, FIG. 11 and FIG. 12 illustrate flowcharts of processing performed upon detection of manipulation of the cue key 212 or the cue button illustrated in FIG. 4 and FIG. 5. The processing is for changing channels to be monitored, which is the processing of the output control procedure. Here, it is not necessary to discriminate between the manipulation of the cue key 212 of the control panel 200 and the manipulation of the cue button on the external controller 30. Processing with discrimination between them will be described later in modifications.

Upon detection of manipulation of the cue key 212 or the cue button, the CPU 11 starts the processing shown in FIG. 11. Here, assume that "LAST CUE" is selected as a method of selecting a channel to be monitored for both the fixed cue bus and the additional cue bus.

In the processing shown in FIG. 11, initially, the CPU 11 determines whether or not a channel corresponding to the manipulated cue key 212 or cue button (which is a channel assigned as a manipulation target to a channel strip 210 containing the cue key 212 or the cue button, referred to as "channel X") is to be monitored (S31).

If the determination in step S31 is negative, the CPU 11 selects the channel X as a new monitor target (S32). Then, the CPU 11 confirms in which mode the seventh and eighth matrix buses 150-7, 150-8 are (S33). If the mode is the normal mode, the CPU 11 turns on the signal transmission from the channel X to the cue bus 170 in order to use only the cue bus 170 for the monitoring (S34).

If the cue mode is confirmed in step S33, output to the additional cue mode must be taken into account. Accordingly, the CPU 11 reads the cue output destination for the channel X set in the processing of FIG. 9 (S35). If the cue output destination is only A, the same processing as that in step S34 may be performed. If it is only B, the CPU turns on the signal transmission from the channel X to the seventh and eighth matrix buses 150-7, 150-8 (S36). Alternatively, if it is both A and B, the CPU 11 turns on the signal transmissions from the channel X to both the cue bus 170 and the seventh and eighth matrix buses 150-7, 150-8 (S37).

By the processing described up to this point, the signal of the channel X can be monitored at the output destination pursuant to the settings of the cue output destination.

Next, the CPU 11 performs the processing to remove the previously selected channel to be monitored from monitor target, pursuant to the settings of "LAST CUE".

Specifically, the CPU 11 searches for any channel to be monitored other than the channel X (S38). If any channel is found, it is assumed as channel Y. Then, if there is the channel Y (S39), the CPU 11 removes the channel Y from monitor target (S40), and also turns off signal transmission from the channel Y to the cue bus (S41 to S43). Here, if the seventh and eighth matrix buses 150-7, 150-8 are in the cue mode, the CPU 11 turns off signal transmissions to both the cue bus 170 and the seventh and eighth matrix buses 150-7, 150-8 (S42). However, if the matrix buses 150-7, 150-8 are in the normal mode, the CPU 11 turns off only signal transmission to the cue bus 170 (S43). This is because, in this case, if the settings of the signal transmission to the seventh and eighth matrix buses 150-7, 150-8 are changed, the operation as matrix buses is affected.

By the processing described above, a state in which only one channel is to be monitored can be maintained in accordance with the settings of "LAST CUE".

In contrast, if the determination in step S31 is affirmative, the processing goes to step illustrated in FIG. 12. In this case, the processing is performed to remove the channel X from monitor target, so that a toggle can be used to select whether or not the channel X is to be monitored.

The processing in step S44 to step S47 in FIG. 12 is the same as that in step S40 to step S43 in FIG. 11 except that the target channel is the channel X.

In the audio signal processing device 10 described above, the seventh and eighth matrix buses 150-7, 150-8 are operated to act temporarily as a cue bus in response to the user's manipulation, thus increasing the number of monitor output lines. This enables concurrent monitoring of signals at multiple different points at low costs without additional installation of cue buses.

Therefore, it is possible to respond a request that two kinds of signals are desired to be monitored at the same time and a request that two kinds of signals are desired to be monitored while being switched without a reselecting operation for monitor target. Regarding the latter, if switching is made between output from the fixed cue bus to the monitor terminal and output from the additional cue bus to the monitor terminal, the monitor signals after mixing in each bus can be monitored while being switched optionally.

Further, because it is enabled to select whether the fixed cue bus or the additional cue bus (or both of them) is used to perform monitoring for each channel, the efficient use of different monitor outputs of two lines is possible.

Note that use of seventh and eighth matrix buses 150-7, 150-8 as the cue bus results in a reduction of the number of the matrix buses, but since a situation in which all the matrix buses are used does not occur much often, switching between the functions whenever the user wants will not cause significantly reduced convenience.

MODIFICATION EXAMPLES

In concluding the description of the embodiment, it is apparent that a specific configuration of the device, the number and kinds of buses and channels, configurations of the control panel and the screens, specific processing procedure, and the like are not limited to those described in the above embodiment.

For example, it is conceivable that the output destinations of monitor signals may be automatically switched based on whether the cue key is manipulated on the control panel 200 of the main body of the audio signal processing device 10 or remotely manipulated on the external controller 30.

Figure 13:
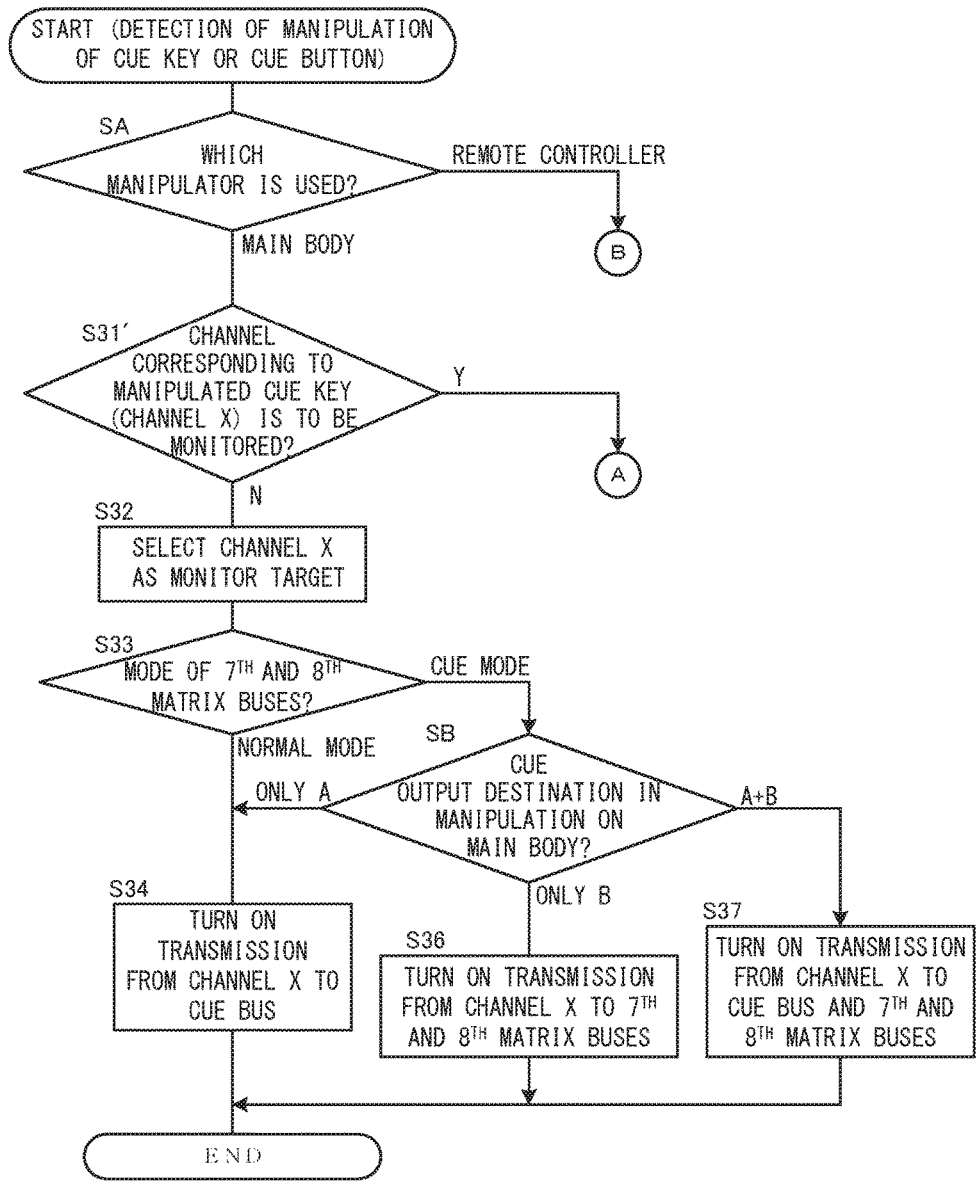
FIG. 13 is a flowchart of processing in a modification example corresponding to FIG. 11.
Figure 14:
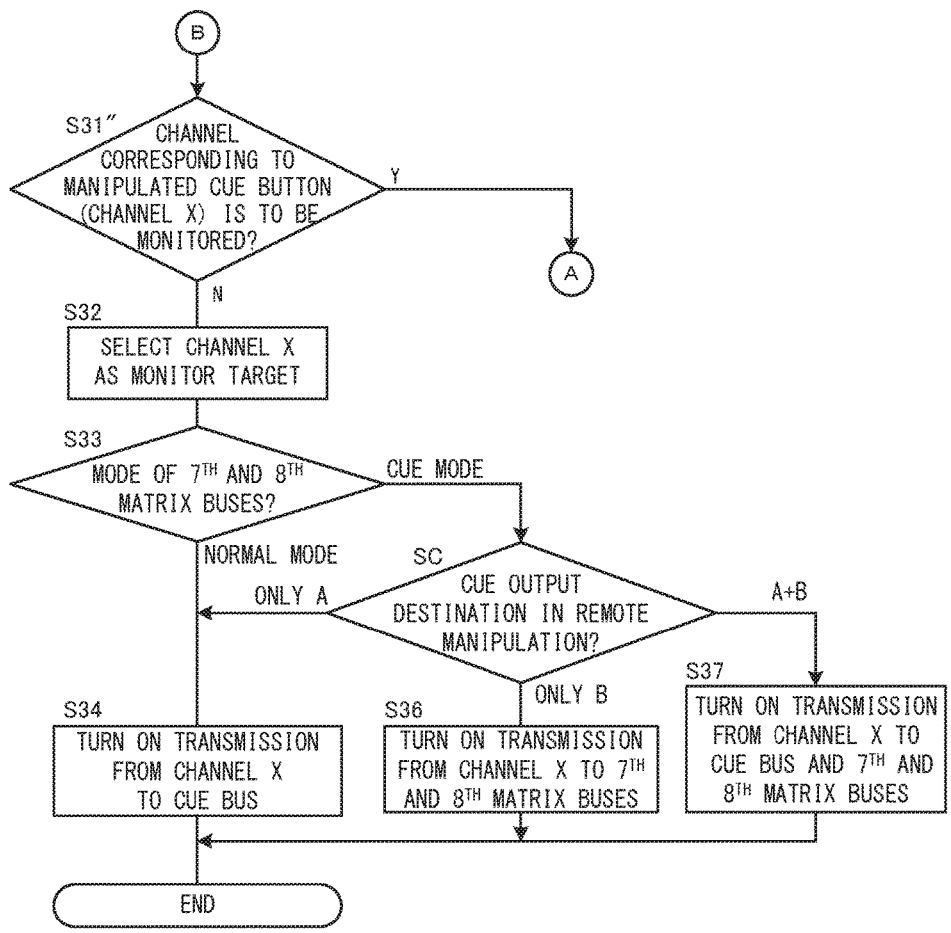
FIG. 14 is a flowchart of the processing continued from FIG. 13.

FIG. 13 and FIG. 14 illustrate flowcharts of the processing in such a case, which corresponds to that in FIG. 11. In FIG. 13 and FIG. 14, like step numbers are used to describe the processing in common with FIG. 11. In the processing in FIG. 13 and FIG. 14, assuming that the settings of the cue output destination for each channel are disabled. Further, in the example, assuming that the method of selecting a channel to be monitored is "MIX CUE".

In the processing in FIG. 13, initially, the CPU 11 determines whether the current detected manipulation of the cue key or cue button is made on the main body or the remote controller (SA). Then, if the manipulation is made on the main body, the procedure proceeds to steps beginning in step S31'. Except that one manipulated in step S31' is the cue key 212, and the settings read in step SB are the settings of the cue output destination when the cue key 212 of the control panel 200 of the main body is manipulated, the processing is the same as the processing in steps S31 to S37 in the FIG. 11 and the processing in FIG. 12 (the processing steps after the determination in step S31 is affirmative are in common with FIG. 12, and are not shown).

On the other hand, if the determination in step SA is that the manipulation is made on the remote controller, the procedure goes to the processing shown in FIG. 14. Except that one manipulated in step S31" is the cue button, and the settings read in step SC are the settings of the cue output destination when the cue button of the external controller 30 is remotely manipulated, this processing also is the same as the processing in steps S31 to S37 in the FIG. 11 and the processing in FIG. 12.

Since the processing to remove other channels from monitor target is unnecessary in the case of "MIX CUE", in either case, the processing is terminated at step S37.

With the above configuration, when the control panel 200 of the main body and the external controller 30 are operated independently by different human operators, each operator can easily monitor a signal of a channel selected by himself/herself. For example, a signal of a channels to be monitored may be outputted to the fixed cue bus when manipulation is made on the main body, and a signal of a channel to be monitored may be outputted to the additional cue bus when remote manipulation is made, and then, the audio signal from each of the buses may be outputted to monitor speakers or earphones used by each operator.

In addition to the above, a bus available as an additional cue bus is not limited to the matrix bus. The reason why the matrix bus is employed in the above-described embodiment is, in terms of the function of the matrix buses, the matrix buses are required to stand ready to be connected to signal transmission paths from many channels. Therefore, by making a relatively small change, the signal transmission paths can be utilized to use the matrix buses as a cue bus.

Specifically, the matrix bus is typically provided as a bus capable of mixing a signal of an input channel and a signal of an output channel which is a resultant signal of mixing of signals from the input channels in the mixing bus. Accordingly, there is a high degree of commonality in functionality between the matrix bus and the cue bus both of which are desired to have a function to input signals at various points including the input channels and the output channels.

However, other than the matrix bus, as long as a bus has similar function, the bus may be easily caused to function as a cue bus in an analogous fashion. For example, it is conceivable that if a path extends to transmit a signal from the output channels 140 to the mixing buses 130 in FIG. 2 directly without passing through the output patch 190, a portion of the mixing buses 130 may be similarly used as a cue bus. For example, even if there is not a signal transmission path from the matrix output channels 160, the bus can be used as an additional cue bus by adding a constraint that signals of the relevant cannels cannot be monitored through the additional cue bus.

Further, the additional cue bus is for only one (stereo) line in the above-described embodiment, but may be for a plurality of lines. For example, it is conceivable that the fifth and sixth matrix buses 150-5, 150-6 may be used as an additional cue bus for a second line. It is apparent that the additional cue buses for three or more lines may be provided. In this case, it is desirable that whether the additional cue bus in each line may be operated in the normal mode or the cue mode can be selected independently.

As a result, further improved convenience regarding the cue function can be offered at low costs.

Further, in the present invention, it is not necessary that the audio signal processing device 10 is equipped with the fixed cue bus 170. It is conceivable that all the cue functions may be covered by the "additional" cue bus in the above-described embodiment.

Further, the example of the cue bus 170 being a stereo bus has been described in the above embodiment. Then, for using the additional cue bus as a stereo bus, a set of two matrix buses 150 is used as an additional cue bus. However, this is not necessary, and it is conceivable that a single matrix bus 150 is used to provide a mono additional cue bus. A 5.1 ch additional cue bus can be provided by use of a set of six matrix buses 150, and the number of channels is not limited. Further, the fixed cue bus and the additional cue bus are not required to be identical in the number of channels.

In addition to the above, it is also possible to make temporary settings common to all the channels applied for each cue output destination in addition to and in priority of the settings for each channel made on the screen of FIG. 8. In this manner, such request can be responded that even when the settings for each channel has been made, the user wants to monitor a signal of a particular channel at a particular output destination while temporarily overturning the presently made setting.

A program according to an embodiment of the present invention is a program for enabling a computer to control or a plurality of computers to cooperate to control the audio signal processing device for implementing the control functionality on the fixed and additional cue buses as described above.

Such a program is executed by the computer(s), producing advantageous effects as described above.

Such a program may be stored in ROM and/or other nonvolatile storage mediums (such as flash memory, EEPROM and/or the like) originally installed in the computer. However, the program may be stored and provided on any nonvolatile storage medium such as a memory card, CD, DVD, Blu-ray disc and/or the like. The program stored in the storage medium may be installed into the computer to run for execution of the above-described procedure.

Further, the computer may be connected to a network so that the program is downloaded and installed into the computer from an external device including a recording medium storing the program or from an external device having a storage storing the program.

The respective configurations and arrangements and the examples of modification described above may be combined for application as appropriate, as long as no discrepancy arises.

INDUSTRIAL APPLICABILITY

As is clear from the above description, according to the invention, an audio signal processing device capable of simultaneous monitoring of signals at multiple different points can be provided at low cost.

REFERENCE SIGNS LIST

10 . . . audio signal processing device, 11 . . . CPU, 12 . . . flash memory, 13 . . . RAM, 14 . . . external equipment I/O, 15 . . . display device, 16 . . . control, 17 . . . waveform input/output unit (I/O), 18 . . . signal processing unit (DSP), 19 . . . system bus, 30 . . . external controller, 40 . . . network, 110 . . . input patch, 120 . . . input channel, 121 . . . attenuator, 122 . . . equalizer, 123 . . . fader, 130 . . . mixing bus, 140 . . . output channel, 150 . . . matrix bus, 160 . . . matrix output channel, 170 . . . cue bus, 180 . . . cue output channel, 190 . . . output patch, 200 . . . control panel, 201 . . . channel strip section, 203 . . . detail displaying area, 210 . . . channel strip, 211, 240 . . . rotary encoder, 212 . . . cue key, 213 . . . selection key, 214 . . . ON key, 215 . . . fader, 215a . . . knob, 230, 300 . . . display, 250 . . . switch group, 400 . . . cue setting screen, 401 . . . cue addition setting button, 402 . . . selecting-method setting button, 403 . . . output selector, 410 . . . cue B setting section, 412 . . . selecting-method setting button, 413 . . . mode link setting button, 414 . . . bypass setting button, 500 . . . cue output setting screen, 501 . . . cue A selection button, 502 . . . cue B selection button

The invention claimed is:

1. A method of controlling an audio signal processing device having a cue bus and a plurality of mixing buses, each for mixing audio signals processed in a plurality of channels each provided with a cue control, the audio signal processing device controlling ON/OFF of signal transmission from each of the channels to the cue bus in accordance with manipulation of the cue control respectively provided with the corresponding channel, the method comprising the steps of:
   accepting a switching instruction to switch a function of the mixing buses;
   switching an operation mode of at least one mixing bus, among the plurality of mixing buses, between a first mode and a second mode in accordance with the switching instruction;
   in the first mode, controlling the audio signal processing device to control ON/OFF of signal transmission from each of the plurality of channels to the at least one mixing bus in accordance with settings of ON/OFF of signal transmission from each of the plurality of channels to the at least one mixing bus; and
   in the second mode, controlling the audio signal processing device to control ON/OFF of signal transmission from each of the channels to the at least one mixing bus in accordance with manipulation of the cue control corresponding to any of the plurality of channels.

2. The method for controlling the audio signal processing device according to claim 1, further comprising the steps of:
   setting, for each of the plurality of channels, whether a transmission destination, in a case of transmitting an audio signal output from the respective channel in accordance with the manipulation of the respective cue control, is the cue bus or the at least one mixing bus; and
   controlling the audio signal processing device, when the operation mode of the switch mixing bus is the second mode and the audio signal processing device transmits the audio signal output from each channel in accordance with the manipulation of the respective cue control, to select a transmission destination of the audio signal in accordance with the set transmission destination.

3. The method for controlling the audio signal processing device according to claim 1, further comprising the steps of:
   controlling the audio signal processing device, when the operation mode of the switch mixing bus is the second mode, to select whether a transmission destination, in a case of transmitting an audio signal output from each channel in accordance with the manipulation of the respective cue control, of the audio signal is the cue bus or the at least one mixing bus on the basis of whether the manipulated cue control is provided in the audio signal processing device or provided in a remote control device located outside of the audio signal processing device.

4. The method for controlling the audio signal processing device according to claim 1, wherein the at least one mixing bus further mixes a first audio signal processed in a first input channel and a second audio signal that has already been mixed in another mixing bus and then is supplied to the at least one mixing bus without passing through any of input channels including the first input channel after the mixing.

5. The method for controlling the audio signal processing device according to claim 1, wherein:
   the accepting step accepts the switching instruction to switch the function of each of a plurality of groups of mixing buses, among the plurality of the mixing buses, each of the plurality of groups including the at least one mixing bus, and
   the switching step switches the operation mode of the at least one mixing bus in one of the plurality of groups between the first mode and the second mode, in accordance with the switching instruction corresponding to the one group.

6. An audio signal processing device having a cue bus and a plurality of channels each provided with a cue control, and that controls ON/OFF of signal transmission from each of the channels to the cue bus in accordance with manipulation of the cue control respectively provided with the corresponding channel, the audio signal processing device comprising:
   a plurality of mixing buses, each for mixing audio signals processed in the plurality of channels;
   an acceptor circuitry configured to accept a switching instruction to switch a function of the mixing buses; and
   a control circuitry configured to switch operation mode of at least one mixing bus, among the plurality of mixing buses, between a first mode and a second mode in accordance with the switching instruction,
   wherein, in the first mode, the control circuitry controls ON/OFF of signal transmission from each of the plurality of channels to the at least one mixing bus in accordance with settings of ON/OFF of signal transmission from each of the plurality of channels to the at least one mixing bus, and
   wherein in the second mode, the control circuitry controls ON/OFF of signal transmission from each of the plurality of channels to the at least one mixing bus in accordance with manipulation of the cue control corresponding to any of the plurality of channels.

7. A non-transitory machine-readable storage medium containing program instructions executable by a processor of an audio signal processing device having a cue bus and a plurality of mixing buses, each for mixing audio signals processed in a plurality of channels each provided with a cue control, the audio signal processing device controlling ON/OFF of signal transmission from each of the channels to the cue bus in accordance with manipulation of the cue control respectively provided with the corresponding channel, to execute a method comprising the steps of:
   accepting a switching instruction to switch a function of the mixing buses;
   switching an operation mode of at least one mixing bus, among the plurality of mixing buses, between a first mode and a second mode in accordance with the switching instruction;
   in the first mode, controlling the audio signal processing device to control ON/OFF of signal transmission from each of the plurality of channels to the at least one mixing bus in accordance with settings of ON/OFF of signal transmission from each of the plurality of channels to the at least one mixing bus; and in the second mode, controlling the audio signal processing device to control ON/OFF of signal transmission from each of the channels to the at least one mixing bus in accordance with manipulation of the cue control corresponding to any of the plurality of channels.

* * * * *